Patented Nov. 8, 1938

2,135,663

UNITED STATES PATENT OFFICE 2,135,663

GLASS COMPOSITION

Walter Hänlein, Berlin-Haselhorst, and Hermann Krefft, Berlin-Friedrichshagen, Germany, assignors to General Electric Company, a corporation of New York No Drawing. Original application June 27, 1936, Serial No. 87,770. Divided and this application January 25, 1937, Serial No. 122,310. In Germany July 12, 1935

1 Claim. (Cl. 106—36.1)

The present invention relates to electric gaseous discharge devices generally, and more particularly to vapor arc devices which operate at relatively high intensities.

A particular object of the invention is to provide a glass of novel composition for use in the arts generally, and which is especially adapted to use within a high intensity gaseous discharge lamp. Another object of the invention is to provide a novel glass which will resist blackening when used as a lamp envelope of a high intensity lamp in which the radiations of caesium are added to those of mercury. Still other objects and advantages of the invention will appear from the following detailed specification.

The invention consists in a new and novel composition of matter, as hereinafter set forth and claimed.

It has been proposed to modify the light emitted by high intensity mercury vapor arc lamps by admixing caesium with the mercury, and by then increasing the temperature of the discharge vessel so as to achieve a sufficiently high caesium vapor pressure so that the caesium radiation constitutes a considerable portion of the total radiation from the discharge. For this purpose it has been found necessary to operate these lamps at temperatures of the order of 500° C. or more. At such high temperatures it has been found that there is appreciable blackening of the lamp envelope where any of the usual glasses of the prior art are used, due to the fact that during operation of the lamp the caesium reacts with the component parts of the glass.

We have now found that these mercury-caesium lamps can be operated without any appreciable blackening provided a novel glass of our invention is used for the lamp envelope. This novel glass has a silica content amounting to only 25 to 40%, a boric oxide content of 10 to 20%, an alumina content of 25 to 35% and an earth alkali oxide content of 20 to 40%. Furthermore the sum of the silica and the boric oxide should not amount to more than 50% of the entire composition. We have found that high intensity mercury vapor lamps having envelopes consisting of such a glass are not only subjected to no blackening during operation but are also resistant to reduction by the caesium vapor even at the high operating temperatures. Calcium oxide and barium oxide are preferably used as the earth alkali oxides in this glass, but where desired they are partially replaced by magnesium oxide and zinc oxide.

The proportion of caesium added to the mercury is ordinarily of the order of 0.2 to 5%, but in some cases, as where the lamp is operated at an especially high temperature, the caesium is introduced in proportions as high at 12%, in which case the caesium radiation becomes especially strong in relation to the mercury radiation. It has been found that even with the larger of these caesium additions, and with the correspondingly higher temperature of the discharge vessel which is necessary therewith, no blackening of the lamp envelope occurs either as a result of the discharge itself or as a result of the chemical influence of the caesium vapor.

This novel glass of our invention has a low coefficient of expansion, and at the same time has a high softening temperature, in excess of that required by the operating temperatures of the mercury-caesium lamp.

The novel glass composition which we have discovered resists blackening when subjected to a high temperature mercury-caesium discharge contains 25 to 40% silica, 10 to 20% boric oxide, 25 to 35% alumina and 20 to 40% earth alkali oxide, the sum of the silica and the boric oxide in all cases being less than 50%. Such a glass has a low coefficient of expansion and is likewise resistant to chemical attack by either mercury vapor or caesium vapor, even at temperatures considerably in excess of 500° C., so that no blackening of the envelope is produced by these vapors during operation of the lamps. A glass of the following composition has proved to be especially suitable:

| | Per cent |
|---|---|
| $SiO_2$ | 35 |
| $B_2O_3$ | 10 |
| $Al_2O_3$ | 30 |
| CaO | 15 |
| BaO | 10 |

This glass has a softening temperature considerably in excess of that required by any of these lamps, so that a discharge at several atmospheres pressure can be operated in a lamp constructed thereof without damage.

While we have described our invention as a glass which is especially suitable for the envelope of a gaseous discharge lamp, it is to be understood that this glass may likewise be used to flash the inside of envelopes of other composition having a suitable coefficient of expansion and transformation point, and may also be used in the art generally. It is likewise to be understood that various other changes, modifications and substitutions, within the scope of the appended claim, may be made in the proportions which we have used to illustrate our invention without departing from the spirit thereof.

This is a division of our co-pending application, Serial No. 87,770, filed June 27, 1936.

What we claim as new and desire to secure by Letters Patent of the United States, is:—

1. A glass having the following composition:

| | Per cent |
|---|---|
| $SiO_2$ | 35 |
| $B_2O_3$ | 10 |
| $Al_2O_3$ | 30 |
| $CaO$ | 15 |
| $BaO$ | 10 |

WALTER HÄNLEIN.
HERMANN KREFFT.